United States Patent [19]

Hashimoto

[11] 4,396,803
[45] Aug. 2, 1983

[54] COPLANAR TYPE DRIVING MECHANISM FOR TELEPHONE ANSWERING AND RECORDING DEVICE

[76] Inventor: Kazuo Hashimoto, 28-2 Komazawa 2-Chome, Setagaya-ku, Tokyo, Japan, 154

[21] Appl. No.: 160,491

[22] PCT Filed: Nov. 6, 1979

[86] PCT No.: PCT/JP79/00286
§ 371 Date: Jul. 7, 1980
§ 102(e) Date: Jun. 19, 1980

[87] PCT Pub. No.: WO80/01027
PCT Pub. Date: May 15, 1980

[30] Foreign Application Priority Data

Jul. 11, 1978 [JP] Japan .................. 53-136881

[51] Int. Cl.³ ............................................ H04M 1/64
[52] U.S. Cl. ....................................... 179/6.03; 360/92
[58] Field of Search ............... 179/6.01, 6.03, 6.06, 179/6.13–6.16; 360/91–92; 242/55.19 R, 55.19 A, 197–201, 204, 208

[56] References Cited

U.S. PATENT DOCUMENTS

| | | | |
|---|---|---|---|
| 3,640,479 | 2/1972 | Hata | 360/92 |
| 3,721,765 | 3/1973 | Ho | 179/6.14 |
| 3,728,487 | 4/1973 | Hata | 179/6.06 |
| 3,833,186 | 9/1974 | Catto et al. | 179/6.13 |
| 3,860,963 | 1/1975 | Ueda | 179/6.03 |
| 4,104,686 | 8/1978 | Hashimoto | 179/6.01 |
| 4,114,834 | 9/1978 | Haake | 242/200 |
| 4,135,058 | 1/1979 | Pfost et al. | 179/6.13 |
| 4,199,794 | 4/1980 | Pfost et al. | 360/92 |

Primary Examiner—Raymond F. Cardillo, Jr.

[57] ABSTRACT

In the case of driving the endless type outgoing message tape T-1 and the reel-to-reel type incoming message tape T-2 individually by engaging two pinch-rollers 5, 6 independently to a common capstan 4 by engaging mechanism 10, which drives the take-up reel TA which is so constructed as to take up the tape in the case of capstan-driving, with a linking means 25 which restricts the movement of taking up the tape T-2 only when the endless type outgoing message tape T-1 is capstan-driven, the wasteful driving of the reel-to-reel type incoming message tape T-2 on the take-up reel table 16 is avoided while the outgoing message tape T-1; is being driven, and linking of said mechanisms 10, 25 is relieved when driving the incoming message tape T-2 alone and thus hindrance in taking up the tape is eliminated.

1 Claim, 3 Drawing Figures

COPLANAR TYPE DRIVING MECHANISM FOR TELEPHONE ANSWERING AND RECORDING DEVICE

FIELD OF ART

This invention pertains to a selective driving mechanism for a plurality tapes, which are driven in a coplanar relationship, wherein one of the tapes is endless and will playback outgoing message and the other is a standard tape for recording incoming messages and wherein a common capstan and two pinch-rollers alternately or sequentially drive said plurality tapes in a telephone answering and recording device.

BACKGROUND ART

Applicant has previously disclosed (in PCT/JP28/00009) the common driving mechanism of two parallel coplanar tapes which are located in coplanar relationship of the tapes is endless for playback of the outgoing message and the other is a tape for recording the incoming message for the telephone answering and recording device. JP, Y2, 54-33378 and JP, A, 54-87510 disclosed separate driving mechanisms which drive said two tapes alternately or sequentially. According to the drawings, in the specifications of the above two publications, it seems that the incoming message tape is driven by its own pinch-roller and by a common capstan while the the pinch-roller for the incoming message tape is not engaged with the common capstan. But unexpectedly, the incoming message tape shall be taken up by the common take-up reel spindle so long as conventional cassette tape decks are used for these purposes, because the take-up reel spindle is driven in conjunction with the capstan and a plurality of idlers through a friction clutch. So, even if the capstan is not engaged by one of the pinch-rollers, the incoming messages tape must still be driven by the common take-up reel spindle. This invention solves this disadvantage by a novel mechanism.

DISCLOSURE OF THIS INVENTION

This invention has such a structure that, in the mechanism which drives the plurality of cassette tapes consisting of an upper layer and a lower layer, which are placed on common reel-tables, alternately by its selective driving function with a common capstan and its own pinch-roller for each of the plurality of tapes, while one of the tapes is being driven by a common capstan and its own pinch-roller, the other tape shall not be taken up by common spindle of the take-up reel table.

BRIEF DESCRIPTION OF DRAWINGS

The details of this invention will be described in connection with the accompanying drawings, in which.

THE BEST EMBODIMENT OF INSTANT INVENTION

Figure 3:
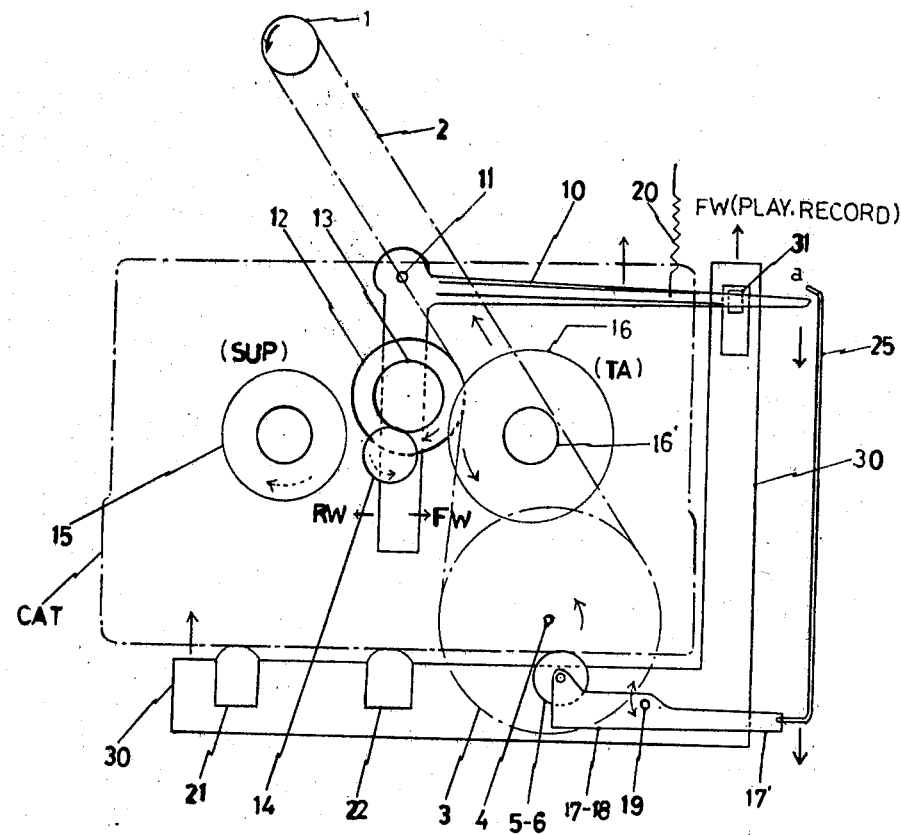
FIG. 3 is a plan drawing that shows the whole mechanism of this invention.
Figures 1, 2:
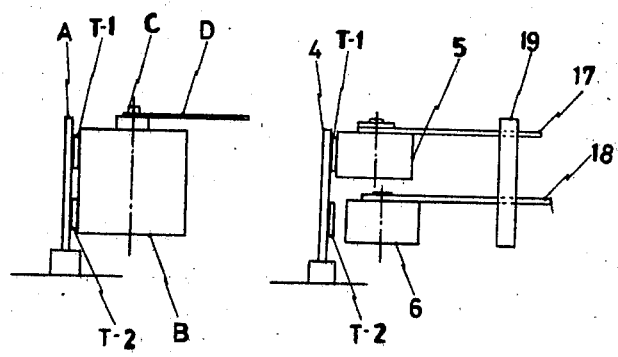
FIG. 1 shows a side view of the common capstan, pinch-roller and two independent tapes.
FIG. 2 shows a side view of the common capstan, two pinch-rollers and two coplanar tapes in this invention.

The details of this invention shall be explained hereinafter, referring to the accompanying drawings. FIG. 1 shows the relation between a common capstan and a common pinch-roller in said PCT/JP78/00009. T-1 is the outgoing message tape, and T-2 indicates the incoming message tape. FIG. 2 shows the independent supporting mechanism for two pinch-rollers which is so constructed as to allow selective engagement of each pinch-roller for each of the outgoing message tape and the incoming message tape to the common capstan 4 by selecting the pinch-roller arms 17 and 18 which are on a common axle shaft 19. FIG. 3 indicates the principle of the basic mechanism for accomplishing the object of this invention in a tape deck which has such a selective engagement of the pinch-roller to a common capstan as shown in FIG. 2. In FIG. 3, 1 is the motor, 2 is the belt, 3 is the flywheel, and 4 is the capstan which is indicated by the same numeral as that shown in FIG. 2. 5 is the pinch-roller for T-1, and 6 is the pinch-roller for T-2. Both of those pinch-rollers are described by one circle since the drawing is a top-plan view. 10 is an actuating lever to actuate a few idlers for driving, which is movably supported around the shaft 11. For example, the moving direction of 10 indicated by an arrow mark FW means fast forward, and RW means rewind. In this embodiment, the driving pulley 13 which is supported on the actuating lever 10 is made of rubber, and the driving pulley 13 and the tension-roller 12 have a common center. When the lever 10 moves in the direction of FW the driving pulley 13 will be engaged with the reel-table 16.

The curved arrow in FIG. 3 indicate the moving direction of the motor, belt, capstan and tension-roller 12.

When the actuating lever 10 is moved to direction FW→ as aforementioned, the driving pulley 13 will be engaged with the periphery of the reel-table 16 and causes it to resolve in to the counter-clock wise direction as shown in FIG. 3. At that time, if the pinch-roller is engaged with the capstan, tape can be driven at steady speed and taken up by the hub-spindle 16' which is coupled to the take-up reel table 16 through a friction clutch (not shown) which has a slip function at overload, as known by those in the art.

If said actuating lever 10 is moved to the direction RW←, the idler 14 moves between the supply-reel table 15 and said driving pulley 13, then causes the supply-reel table 15 to revolve in the curved dotted arrow-marked direction. So, the tape will be rewound at high speed. It is clear that if the capstan and the pinch-roller are not engaged, the driving pulley 13 drives the take-up reel TA at high speed (viz. Fast Forward) when the lever 10 is biased in the direction FW→. All the above functions are known in conventional cassette tape recorder.

In FIG. 3, 21 is the two-track erasing head, and 22 is the two-track recording/playback head. The outer line, viz. CAT as shown with the dot and dash line is the housing of the special cassette which is used for this invention. The housing (hereinafter called "Cassette half") is divided into upper and lower compartments as in JP. A. 54-87510, and a plurality of tapes, for example, T-1 and T-2 are housed within these compartments as shown in FIG. 2.

It is also possible to use 2 standard cassette tapes. For instance, a separate top cassette is used for T-1, and a separate bottom cassette is used for T-2. As this is deemed to be an equivalent arrangement to that shown in FIG. 2, details thereof are omitted herein.

If the above special cassette(s) are used, the following problem results. If the pinch-roller 5 is engaged with the capstan 4 in order to drive the tape T-1, where the pinch-roller 6 is not engaged with the capstan as mentioned above, the driving pulley 13 makes the reel-table 16 and hub-shaft 16', revolve in the direction of the curved arrow, so long as the actuating lever is biased to FW and the flywheel 3, belt 2 and tension roller 12 are rotated by the motor 1. Therefore, while T-1 is driven by the capstan 4 and the pinch-roller 5, tape T-2 will also be driven (taken up) by the hub-shaft 16' on the reel-table 16, even if the pinch-roller 6 is not engaged with the common capstan 4. It may be possible to prevent rotation of the hub-shaft 16' under these conditions by adjustment of the clutch between said reel-table 16 and hub-shaft 16' or by other means, but such an adjustment is extremely difficult because, depending on the variation in diameter of taken-up tape, the slipping condition or clutch power will be changed. Thus T-2 will be driven simultaneously with T-1. Accordingly, a blank portion, which is equal to the length of the outgoing message on T-1, will be created on T-2 between the first incoming message and the second incoming message. Even if fine adjustment of the clutch (as noted above) is attempted, T-2 is inevitably taken up to some extent by the hub-shaft 16'and the blank portions created between incoming messages are extremely irregular.

The object of instant invention is to overcome the above noted problem. The details of the means of resolving the problem are set forth hereinafter.

In FIG. 3, the connecting link 25 connects a portion 17' of the supporting plate 17 and an end "a" of the actuating lever 10. This end of connecting link 25 is connected flexibly to the end "a" of said actuating lever 10. In order to engage the pinch-roller 5 to the capstan 4, the sliding head table 30 is moved by a solenoid plunger 31 for instance, and also the supporting plate 17 is movably fixed around the shaft 19 by conventional spring action (not shown). At that time, portion 17' of said supporting plate 17 for the pinch-roller 5 moves in the arrow-marked direction, and then, the connecting link 25 pulls down the end "a" of the actuating lever 10 slightly as shown by the other arrow. The actuating lever 10 is thus rotated slightly to the direction RW (rewind) around the shaft 11 at its center and the driving pulley 13 is slightly disengaged from the reel-table 16. If the driving pulley 13 is separated beyond slight clearance, then it causes the well known rewind function. The clearance between the driving pulley 13 and the reel-table 16 can be approximately 1 mm. In order to engage the capstan and the pinch-roller, L-shaped sliding head table 30 is moved by the solenoid plunger coil, etc., but this engagement can be also carried out by utilizing the driving mechanism disclosed in JP, A, 54-63750. It is not shown in FIG. 3, but selective engagement means for supporting plates 17 and 18 are necessary to keep each separate pinch-roller engaged with the capstan. Many known mechanisms can be adapted by those skilled in the art to accomplish this and the details thereof are thus omitted here. The mechanism is thus constructed to ensure that when the pinch-roller 5 is engaged to the capstan, movement of the actuating lever 10 is controlled by the link 25, and the driving pulley 13 is kept slightly separated from the take-up reel table 16.

While driving type T-2 by engagement of the pinch-roller 6 with the capstan 4, pinch-roller 5 remains separated from capstan 4 and link 25 is not operated nor is end "a" of actuating lever 10 controlled thereby. Thus, the actuating lever 10 is free to move to engage the driving pulley 13 with the take-up reel table 16 and the hub-shift 16', which is connected by a clutch mechanism (not shown) to that reel table. Thus, Type T-2 is actively taken-up by the take-up reel as the capstan 4 drives type T-2 in cooperation with the pinch-roller 6. It is not necessary to engage either pinch roller (5 or 6) to enable rewind or fast forward of the tape T-2, since reel drive is used as shown. Moreover, the L-shaped table 30 is not moved so that tape T-2 is free from head engagement as well as pinch-roller engagement during these modes.

CAPABILITY OF EXPLOITATION IN INDUSTRY

Since this invention provides a system, which is more advanced than that set forth in said PCT/JP78/00009, enabling independent driving of each of plural tapes of a coplanar arrangement by eliminating restriction of the driving time of the incoming message tape which is controlled by one cycle time of the endless type outgoing message tape in the prior art. The same functions as those of the standard telephone answering and recording device in the prior art, which uses two tape decks, can now be achieved by use of only one tape deck. Thus, the effect and utility of the instant invention is great and remarkable.

While the invention has been described in detail with respect to the various illustrated figures, it will be appreciated that various modifications may be made by those of ordinary skill in the art without departing from the true scope or spirit of the invention.

What is claimed as the invention is:

1. A coplanar tape driving mechanism in a telephone answering device, which includes means to respond to an incoming call on a telephone line, characterized by
    an incoming message tape (T-2) which is mounted on a supply reel and a take up reel and including means for driving said incoming message tape (T-2) with a common capstan, a first pinch roller and a spindle which fits into a hub at the center of the take up reel,
    an outgoing message tape (T-1) and means for containing said out-going message tape (T-1) space above or below said incoming message tape (T-2), said outgoing message tape (T-1) being wound around a reel which fits over or under part of said spindle said outgoing message tape being driven by means including a second pinch roller which cooperates with said common capstan, motor torque transmitting means to transmit the motor torque from a common motor to said spindle, the mechanism further including means to establish an outgoing message tape (T-1) drive made independent of an incoming message tape (T-2) drive mode, including linking means which causes the second pinch roller to engage the out-going message tape (T-1) with the common capstan so as to drive said out-going message tape (T-1) where said linking means prevents said motor torque transmitting means from driving said spindle while said linking means operates and further means to engage the motor torque transmitting means and said spindle by disengaging said linking means which causes said second pinch roller to release said outgoing message tape (T-1) from engagement with said common capstan and to cause the incoming message tape (T-2) to be driven.

* * * * *